United States Patent [19]

Grüske

[11] Patent Number: 4,645,074
[45] Date of Patent: Feb. 24, 1987

[54] SYSTEM FOR THE ORGANIZED STORAGE OF A PLURALITY OF RECORD CARRIERS

[76] Inventor: Werner Grüske, Am Mühlgarten 21, D-8521 Spardorf, Fed. Rep. of Germany

[21] Appl. No.: 763,434

[22] Filed: Aug. 7, 1985

[30] Foreign Application Priority Data

Aug. 30, 1984 [DE] Fed. Rep. of Germany ....... 3431814

[51] Int. Cl.⁴ .......................................... B65D 85/672
[52] U.S. Cl. ..................................... 206/309; 206/1.5; 206/444; 312/8
[58] Field of Search ............... 206/387, 1.5, 307, 309, 206/444; 312/8-19

[56] References Cited

U.S. PATENT DOCUMENTS

| 3,489,475 | 1/1970 | Boyce et al. | 312/14 |
| 4,401,216 | 8/1983 | Koch | 206/387 |
| 4,519,655 | 5/1985 | Kamperman | 206/387 |

FOREIGN PATENT DOCUMENTS

| 7737862 | 7/1978 | Fed. Rep. of Germany. | |
| 3136755 | 3/1983 | Fed. Rep. of Germany | 206/387 |
| 3202204 | 8/1983 | Fed. Rep. of Germany. | |

Primary Examiner—William Price
Assistant Examiner—Jimmy G. Foster
Attorney, Agent, or Firm—Bacon & Thomas

[57] ABSTRACT

The invention discloses a system for the organized storage of a large number of sheet- or disk-like record carriers, particularly of diskettes or microfiches. A container for holding the record carriers has a printed form that has line markings corresponding to a number of record carriers which have additional line markings on their outside edges. The line markings located on the edge of the record carrier are aligned with matching line markings on a printed form on the container. Several containers can be stacked or arranged side-by-side by attachments on the outside surfaces of the containers in order to combine the system simply and easily with other systems of this type into appropriate blocks. A locking plate also can be provided.

9 Claims, 6 Drawing Figures

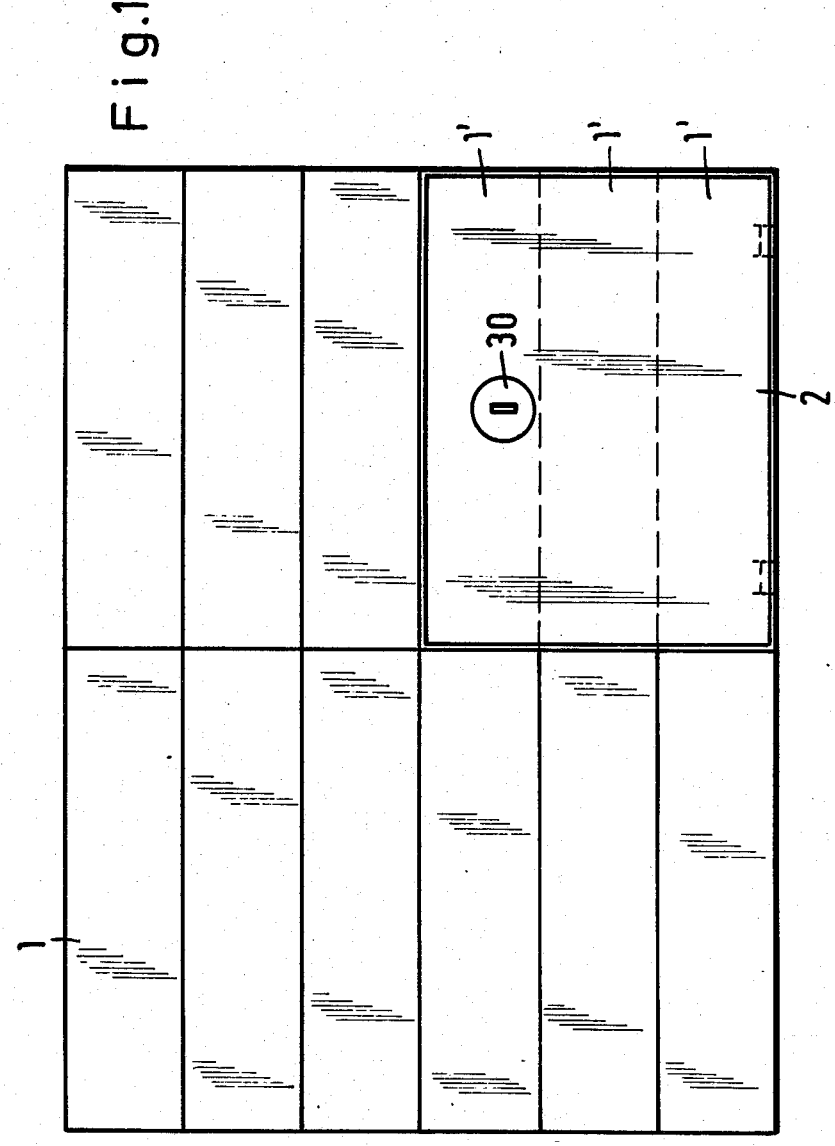

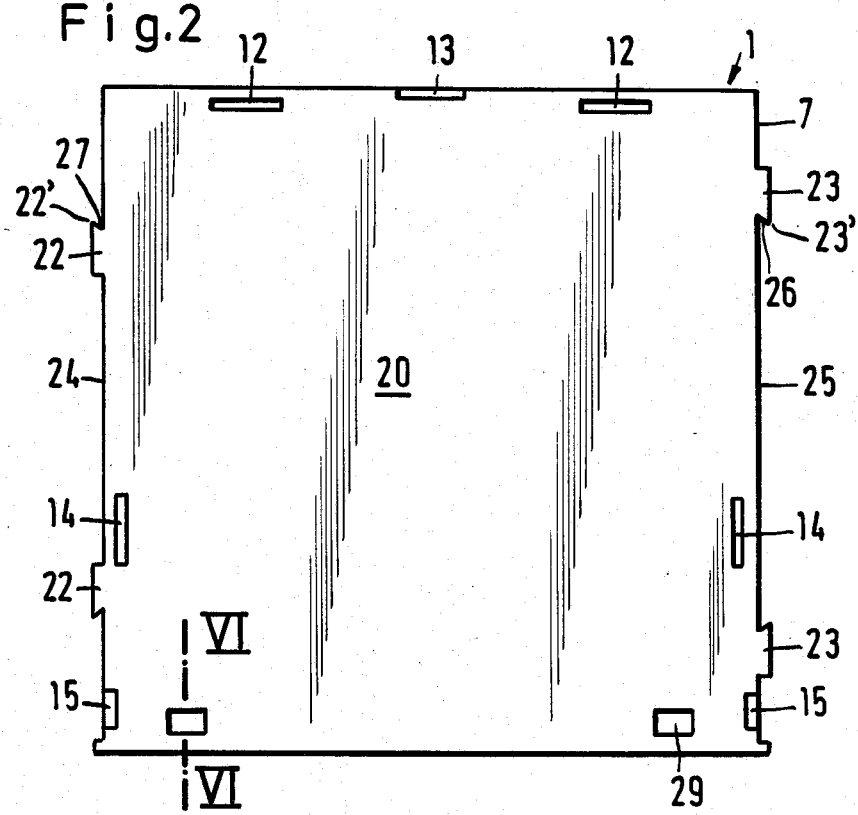
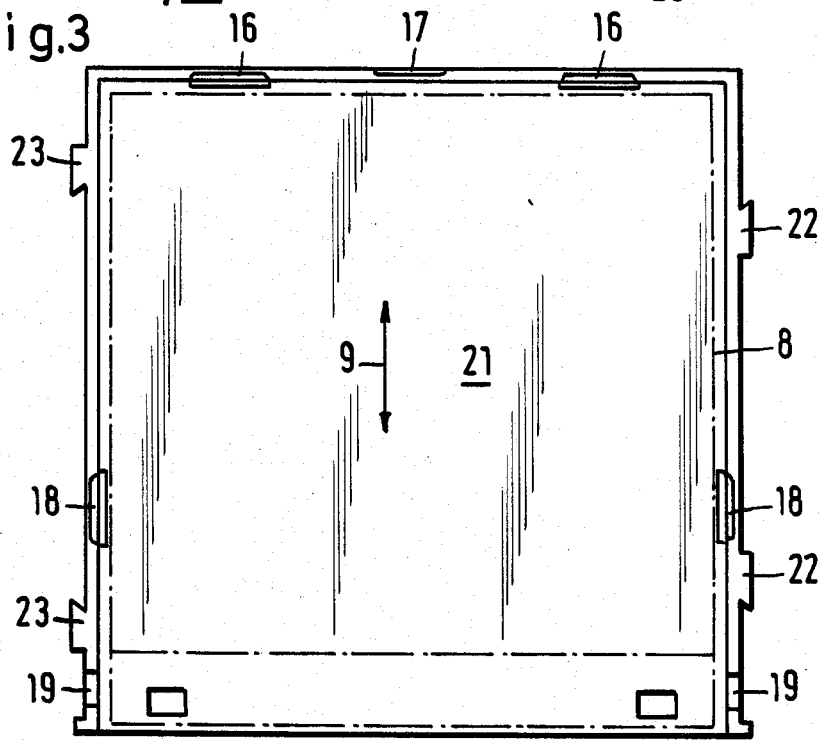

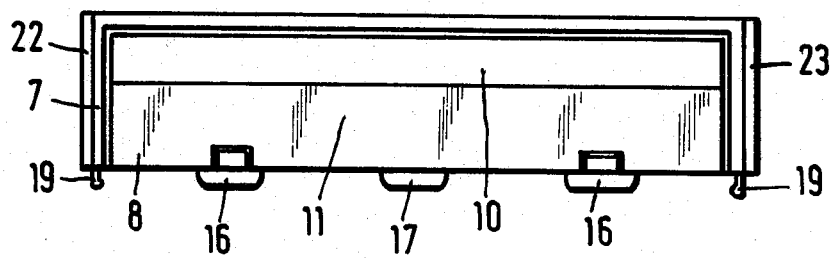
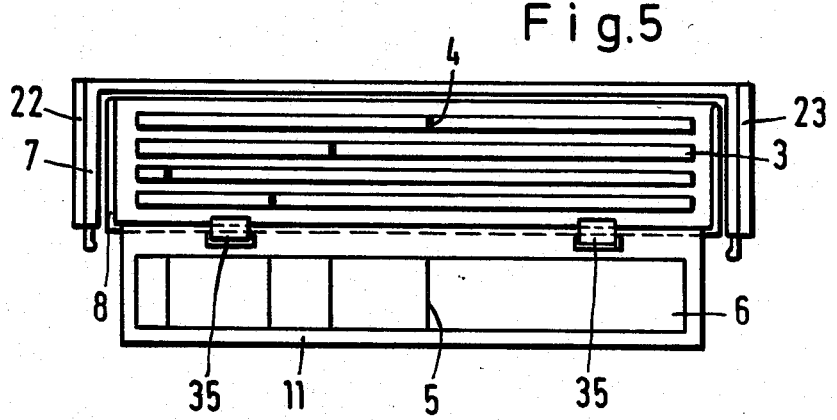
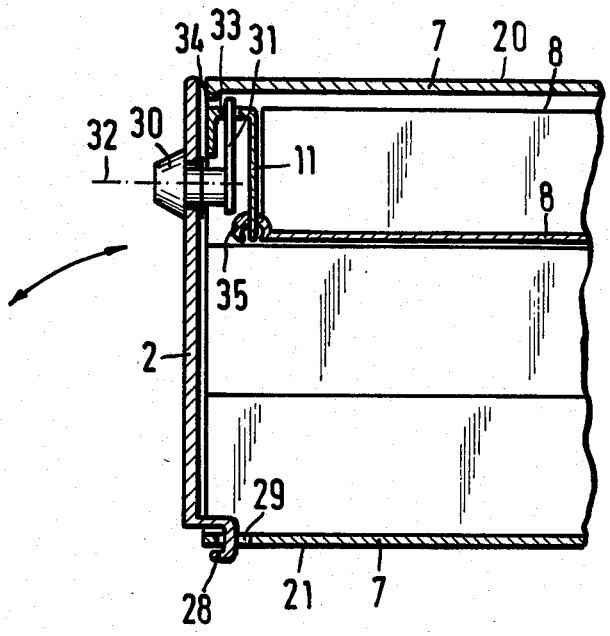

SYSTEM FOR THE ORGANIZED STORAGE OF A PLURALITY OF RECORD CARRIERS

FIELD OF THE INVENTION

The invention concerns a system for storing and locking together a plurality of individual containers each containing a number of record carriers.

BRIEF DESCRIPTION OF THE PRIOR ART

A system is shown in German Pat. No. 22 08 684 in which record carriers are combined in groups, and each group is stored in a container in a slide-in unit. Each slide-in unit has a lid-like cover that is hinged to the unit's base plate. The cover swings down when the slide-in unit is pulled out of the container, and line markings on the inside become visible. Each record carrier has a line marking on its outward edge that is aligned with a matching line marking on the printed form on the cover.

SUMMARY OF THE INVENTION

It is the purpose of this invention to develop an individual system such that it can be combined simply and easily with other systems of this type into corresponding blocks, preferably with a capability for keeping part of the systems in such blocks under lock and key for secrecy or for data protection.

The above-mentioned problem is solved, by providing means on the containers to stack one on top of the other and/or side-by-side. Several systems, or containers, can be stacked and/or placed side-by-side as desired, and arranged so as to be firmly connected to each other. It thus is possible to adjust to existing space in a cabinet, a desk drawer, or other space as desired. It is recommended in this connection that some number, nine, for example, of such containers (or systems) stacked one above the other have the standard height of a binder, and when arranged side-by-side, the standard width of a desk drawer.

The containers may be made so as to be disconnectable, enabling a block of containers to be taken apart and rearranged one above the other and/or side-by-side. In this way, they can be placed on another cabinet shelf, or the like, with different dimensions.

Various features are described to provide advantageous means for making connections.

The invention also envisions means to lock a plurality of containers to provide a security feature. In this embodiment, the arrangement allows locking of a specific number of containers, three, for example, by means of a locking plate. This is important for the preferred area of the invention, namely that of the storage of diskettes or microfiches, because the containers can be used to store data that must be kept secret. For example, carriers that contain data that a firm wants kept secret (such as personnel data) can be stored in containers that can be locked by the locking plate. The rest of the containers in an arrangement such as this can be used to store carriers that contain data that need not be kept secret. The special advantage of this arrangement is that, aside from the secret-keeping capability, the freely accessible data carriers, and those to be kept secret, are found in a joint arrangement, or block. The costly and involved storage of data to be kept secret in a separate, lockable compartment, safe, or the like, is thus eliminated.

Advantageous forms of the locking plate and accessories that are relatively simple to make and easy to operate are also disclosed.

The invention also describes an advantageous, solid, and easy to manipulate form of the containers. The cover described can be made so as to accommodate a lock bolt for the locking plate.

BRIEF DESCRIPTION OF THE DRAWINGS

Additional advantages and features of the invention can be ascertained in detail from the secondary claims, as well as from the following description and the pertinent drawing of design approaches applicable to the invention. The drawing shows:

FIG. 1 is a front view of an arrangement of several containers in accordance with the invention.

FIG. 2 is a top plan view of a single container.

FIG. 3 is a bottom view of the container shown in FIG. 2.

FIG. 4 is a front view of the container of FIGS. 2, 3, with closed cover.

FIG. 5 is a front view of the container of FIG. 4, but with cover open.

FIG. 6 is a partial section taken along line VI—VI in FIG. 2.

DETAILED DESCRIPTION OF THE PREFERRED EMBODIMENTS

FIG. 1 shows schematically a total of 12 containers 1, six of which are stacked on top of each other, and two such stacks arranged side by side. The individual containers 1 are attached to each other at their abutting ends, preferably so they can be detached. The three bottom right containers 1' shown in FIG. 1 are locked by locking plate 2, which will be described below. As already mentioned, the containers serve to store sheet- or disk-like record carriers, particularly diskettes or microfiches 3, a stack of which is shown in FIG. 5 with line markings 4 that match the corresponding line markings 5 on printed form 6. This corresponding line indexing system is shown in German Pat. No. 22 08 684.

One version of the attachment of individual containers 1 which, as already mentioned, preferably should be detachable, is shown in FIGS. 2 and 3. These containers consist of a housing 7, and slide-in units 8, which can be pushed into, or drawn out of, housing 7 as shown by double arrow 9 (FIG. 3). Hand-hold 10, on front cover 11, which will be explained in detail below, of slide-in unit 8 can be used to withdraw the unit. Recesses 12, 13, 14 and 15 in the top surface (or bottom surface) and insertable projections 16, 17, 18 and 19 of the bottom surface (or top surface) of housing 7 serve to stack the containers one above the other. The top surface is numbered 20 in FIG. 2, and the bottom surface is numbered 21 in FIG. 3.

Strips 22 and 23, forming back tapers and extending from top to bottom, serve to attach the sides. Strips 22 of left side 24 are offset relative to strips 23 of side 25, on the right side in the drawing, such that in the direction of double arrow 9 ends 22' of strips 22 fit into back tapers 26 of strips 23, and ends 23' of strips 23 fit into back tapers 27 of strips 22.

Locking plate 2, shown schematically in FIG. 2, is shown in profile in more detail in FIG. 6. The locking plate can be secured in place at its lower end in corresponding openings 29 in the bottom of housing 7 by hooks 28. This securing arrangement 28, 29 can be made such that locking plate 2 can swing in the direction of the double arrow in FIG. 6. There is a lock 30 in the upper part of the plate, lock bolt 31 of which can turn on axis 32 such that in the locked position the bolt passes through a slot 33 of cover 11 and locks behind stop 34 in the top plate of upper housing 7. The containers, the slide-in units, and thus the data carriers stored therein, are located behind locking plate 2 and are thus secure against unauthorized access. If necessary, additional means can be provided in this case to prevent individual containers from being lifted off each other; bonding the containers together, for example. It is understood that the locking plate shown in FIG. 1 can cover not only three stacked containers 1', but other numbers as well. It can also cover containers arranged side-by-side. The dimensions of the locking plate need only be selected to suit the purpose for which intended.

It is recommended that all parts mentioned above (with the exception of the lock and lock bolt) be made of plastic. Cover 11 can be hinged in hook 35 on the base of the housing in question. The inner surface of the cover displays printed form 6 (see FIG. 5) when the cover is in the dropped position.

What is claimed is:

1. In a system for the organized storage of a plurality of sheet or disk-type record carriers, such as diskettes or microfiches, having a container to hold a plurality of the record carriers wherein the container and carriers have corresponding indexing line markings, the improvements comprising:
    (a) interlocking means on the container adapted to permit a plurality of containers to be stacked one upon the other and to interlock a plurality of containers in side-by-side arrangement;
    (b) a locking plate;
    (c) means hingedly attaching one edge of the locking plate to a container; and
    (d) a security lock attached to the locking plate and adapted to engage a container, the security lock including a lock bolt which engages a projection formed on a front portion of a container to secure the lock plate in position.

2. An improved system in accordance with claim 1 wherein the interlocking means are disconnectable from each other.

3. An improved system in accordance with claim 1 wherein the interlocking means for stacking the plurality of containers comprises: (a) a plurality of projections extending from one side of the container; and (b) a plurality of recesses defined by an opposite side of the container.

4. An improved system in accordance with claim 1 wherein the interlocking means comprises: (a) a plurality of first strips extending from a first side of the container, each of the strips having a tapered surface adjacent to the side of the container; and, (b) a plurality of second strips extending from a second, opposite side of the container, each of the second strips having a tapered surface adjacent to the side of the container such that the tapered surfaces of the second strips contact the tapered surfaces of the first strips of an adjacent container to lock the containers together side-by-side.

5. An improved system in accordance with claim 4 wherein the first strips are offset with respect to the second strips.

6. An improved system in accordance with claim 5 comprising: (a) a pair of first strips, the strip having a side facing the other strip tapered so as to form a dovetail-groove configuration; and (b) a pair of second strips, each having a side facing away from the other second strip tapered so as to slidably fit within the dovetail groove configuration of an adjacent container.

7. A system in accordance with claim 1 wherein the means hingedly attaching the locking plate to the container and the security lock attaches to the container such that it remains attached to the containers when they are removed from the remaining, unlocked containers.

8. A system in accordance with claim 1 wherein each container comprises:
    (a) a housing;
    (b) a carrier holding unit slidably mounted within the housing; and
    (c) a cover hingedly attached to a front of the housing, the cover having the index line markings thereon.

9. A system in accordance with claim 8 further comprising a slot defined by the cover dimensioned so as to engage the lock bolt.

* * * * *